US007411185B2

(12) United States Patent
Waki

(10) Patent No.: US 7,411,185 B2
(45) Date of Patent: Aug. 12, 2008

(54) ATMOSPHERIC PRESSURE IONIZATION MASS SPECTROMETER SYSTEM

(75) Inventor: Hiroaki Waki, Kyoto (JP)

(73) Assignee: Shimadzu Corporation, Kyoto (JP)

( * ) Notice: Subject to any disclaimer, the term of this patent is extended or adjusted under 35 U.S.C. 154(b) by 373 days.

(21) Appl. No.: 11/287,287

(22) Filed: Nov. 28, 2005

(65) Prior Publication Data

US 2006/0124849 A1 Jun. 15, 2006

(30) Foreign Application Priority Data

Dec. 14, 2004 (JP) ............................ 2004-361071

(51) Int. Cl.
*B01D 59/44* (2006.01)
*H01J 49/00* (2006.01)

(52) U.S. Cl. ....................... 250/288; 250/281; 250/282; 250/287; 250/290; 250/291; 250/423 R; 250/425; 703/2; 703/12

(58) Field of Classification Search ................. 250/281, 250/282, 288, 290, 291, 287, 423 R, 425; 703/2, 12
See application file for complete search history.

(56) References Cited

U.S. PATENT DOCUMENTS

| | | | | |
|---|---|---|---|---|
| 6,501,073 | B1 * | 12/2002 | Mylchreest et al. | 250/288 |
| 7,145,136 | B2 * | 12/2006 | Yang et al. | 250/288 |
| 2006/0054805 | A1 * | 3/2006 | Flanagan et al. | 250/288 |

* cited by examiner

*Primary Examiner*—Jack I. Berman
*Assistant Examiner*—Meenakshi S Sahu
(74) *Attorney, Agent, or Firm*—Manabu Kanesaka

(57) ABSTRACT

An atmospheric pressure ionization mass spectrometry system has an atmospheric pressure ionization chamber for ionizing a sample, an evacuated intermediate evacuation chamber into which generated ions are introduced through a capillary tube, and a vacuum chamber further downstream therefrom into which ions are introduced for mass separation. A partition wall separating the atmospheric pressure ionization chamber from the intermediate evacuation chamber includes a small orifice having a diameter corresponding to an internal channel diameter of the capillary tube. The capillary tube is detachably installed on the partition wall so that an outlet end of the capillary tube abuts on the small orifice. The internal channel of the capillary tube is in communication with the small orifice. The capillary tube can be installed and removed from the system without breaching the vacuum.

6 Claims, 3 Drawing Sheets

ATMOSPHERIC PRESSURE IONIZATION MASS SPECTROMETER SYSTEM

BACKGROUND OF THE INVENTION AND RELATED ART STATEMENT

The present invention relates to a mass spectrometer system that includes an atmospheric pressure ionization interface suited for use in combination with a liquid chromatograph, i.e., as a liquid chromatograph mass spectrometer.

A mass spectrometer (hereinafter referred to as "MS") is occasionally used in combination with a liquid chromatograph, as a liquid chromatograph mass spectrometer (hereinafter referred to as LC/MS). In an LC/MS, the components of a sample separated by liquid chromatography are introduced into the MS for mass spectrometry. In order to perform mass spectrometry, an interface is required to ionize the separated components. In recent years, a method of performing ionization under atmospheric pressure, such as an electrospray interface or an atmospheric pressure chemical ionization interface, has been generally employed as the interface for an LC/MS.

The mass spectrometer located downstream from such an interface is generally operated under a high vacuum condition. Accordingly, an LC/MS employing the atmospheric pressure ionization method usually comprises an atmospheric pressure ionization chamber for ionizing the liquid introduced from the liquid chromatograph unit under atmospheric pressure, and an intermediate evacuation chamber disposed between that and the mass spectrometry chamber with a built-in mass spectrometer. Evacuation systems are disposed in the intermediate evacuation chamber and the higher vacuum evacuation chamber downstream therefrom so that the degree of vacuum increases gradually from the upstream to the downstream chambers.

FIG. 3 is a schematic view of one example of such a conventional LC/MS.

In the figure, reference numeral 1 denotes a liquid chromatograph unit, 20 denotes a mass spectrometry unit, and 10 denotes an interface unit that couples the two.

The liquid eluting from the liquid chromatograph unit 1 is atomized in the interface unit 10 and sprayed from a nozzle 14 into the atmospheric pressure ionization chamber 15 where the sample component molecules contained in the elution are ionized. The ions generated are led through a capillary tube 11 to a roughly evacuated intermediate evacuation chamber 21, where the ions are converged by a convergent lens 24, and sent to a higher vacuum second intermediate evacuation chamber 22, where they are converted into a beam by an ion lens 25.

The ions are then introduced into the mass spectrometry chamber 23, which is maintained under an even higher vacuum, and sent to a central space in a quadrupole filter 26 composed of four rod electrodes. A voltage, with an AC voltage superimposed on a DC voltage, is applied to the quadrupole filter 26. Only the ions having a specific mass number (more precisely, mass-to-charge ratio) that corresponds to the voltage pass through the quadrupole filter 26 and reach the ion detector 27. At the ion detector 27, the current in correspondence with the number of ions reached is taken out as an output signal.

The capillary tube 11 is disposed through the partition wall 16, which separates the atmospheric pressure ionization chamber 15 from the intermediate evacuation chamber 21, so that the atmospheric pressure ionization chamber 15 is in communication with the intermediate evacuation chamber 21 only through the capillary tube 11. Accordingly, a portion of the gas present in the atmospheric pressure ionization chamber 15 flows through the capillary tube 11 into the evacuated intermediate evacuation chamber 21.

The capillary tube 11 constitutes a desolvating unit 12 in conjunction with a heating block 12a fitted around the tube. The desolvating unit 12 functions as a means for removing solvent components contained in the charged particles generated in the atmospheric pressure ionization chamber 15. In other words, a portion of the charged particles sprayed from the nozzle 14 is caused to flow into the capillary tube 11 due to the pressure difference between the atmospheric pressure ionization chamber 15 and the intermediate evacuation chamber 21, and is heated by the heating block 12*a*, thereby promoting the desolvating process as the particles are introduced into the intermediate evacuation chamber 21.

Non-volatile components of the samples analyzed or inorganic salts from the liquid mobile phases used can accumulate inside the capillary tube 11. Thus, the capillary tube requires periodic maintenance that entails removal for cleaning or replacement. In order to reduce the down time for carrying out such maintenance, there has been made available a system, which includes an isolation gate 13 disposed on the partition wall 16, as indicated by the broken line in FIG. 3, to allow for the removal of the capillary tube 11 without lowering the degree of vacuum. An isolation gate is generally an opening that is formed for placing or removing an object through a partition wall of a vacuum chamber. In this instance, the capillary tube 11 is detachably inserted through the isolation gate 13, which is constructed so as to automatically close the opening when the capillary tube 11 is pulled out.

FIG. 4 illustrates one example of such a conventional self-closing isolation gate 13. In FIG. 4, the isolation gate 13 is constructed integrally with the heating block 12*a*, and the left side of the partition wall 16 is maintained at atmospheric pressure and the right side is maintained at an approximate vacuum. The capillary tube 11 is inserted through the heating block 12. In the state shown, the ball 33 is pushed up by the capillary tube 11. When the capillary tube 11 is pulled out to the left, the ball 33 is dropped by the force of the spring 34 so as to block the hole created after the capillary tube 11 is removed. See, for example, the disclosure of Japanese Laid-open Patent Publication No. 2002-198006.

Reference numeral 35 denotes a cover that prevents contamination from the particles being sprayed in the atmospheric pressure ionization chamber 15.

Such an isolation gate 13, as one example thereof is shown in FIG. 4, is a type of valve mechanism, and its complex construction can cause various problems. In addition, it has the shortcoming of reduced efficiency in transporting ions, since ions are dispersed in this complex valve portion. As shown in FIG. 3, moreover, the convergent lens 24 is often placed in the intermediate evacuation chamber 21 where the isolation gate 13 is located. Thus, the isolation gate 13 restricts the positioning of the convergent lens 24.

The present invention has been developed in view of the aforementioned problems. It is an object of this invention to provide an atmospheric pressure ionization MS with improved maintainability and utilization by omitting the isolation gate, and to improve the construction so as to enable the installation and removal of the capillary tube without breaching the vacuum.

Further objects and advantages of the invention will be apparent from the following description of the invention and the associated drawings.

SUMMARY OF THE INVENTION

In order to achieve the above object, in accordance with the atmospheric pressure ionization MS of the present invention, the partition wall that separates the atmospheric pressure ionization chamber from the intermediate evacuation chamber is provided with a small orifice having a diameter corresponding to the inner diameter of the capillary tube. The capillary tube is detachably installed on the partition wall so that the rear end thereof abuts on the small orifice, and the internal channel of the capillary tube is in communication with the small orifice. Such a construction allows the atmospheric pressure ionization chamber to remain in communication with the intermediate evacuation chamber through the small orifice even when the capillary tube is removed. Thus, the required vacuum can be maintained in the downstream chamber without significantly increasing the load applied to the vacuum pump located therein.

The present invention is simple in construction and effective in saving space. It is, therefore, not prone to problems and does not present an obstacle to placement of the convergent lens.

In addition to its extremely simple construction, the present invention allows for the removal of the desolvating unit without breaching the vacuum, and thus can provide an atmospheric pressure ionization MS with excellent maintainability and a high rate of utilization.

DETAILED DESCRIPTION OF THE PREFERRED EMBODIMENTS

Figure 1:
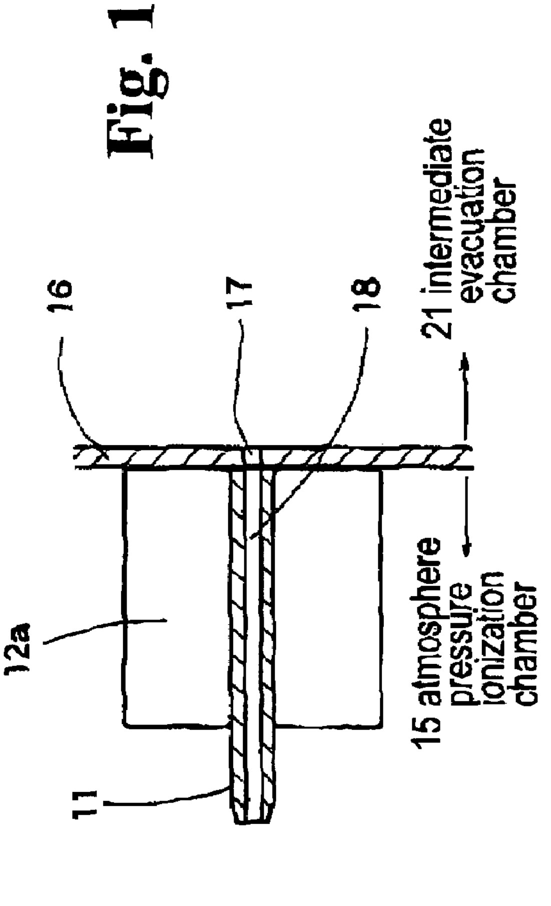
FIG. 1 is a diagram showing one embodiment of the present invention.
Figure 3:
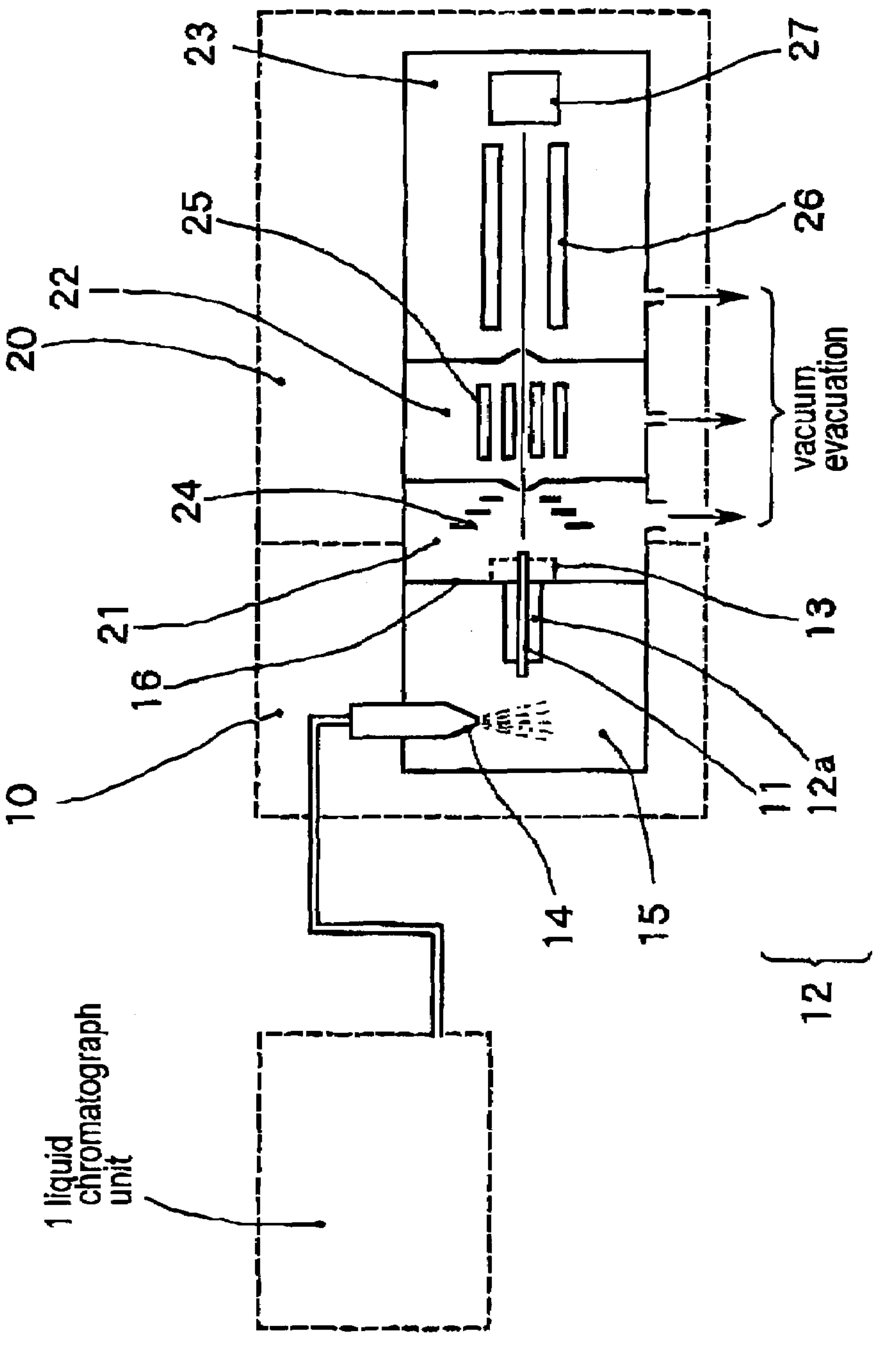
Fig. 3 Prior Art
FIG. 3 is a schematic diagram of a conventional LC/MS.
Figure 4:
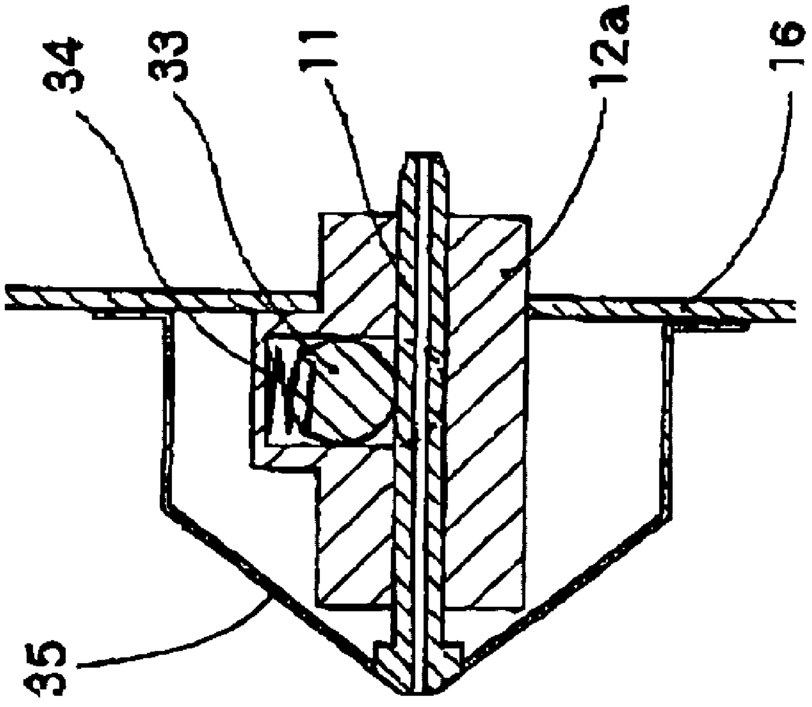
Fig. 4 Prior Art
FIG. 4 is a diagram showing one example of a conventional isolation gate.

FIG. 1 illustrates one embodiment of the present invention. The figure only shows the section corresponding to the desolvating unit 12 in FIG. 3 and its vicinity. The overall construction of the MS is substantially the same as that shown in FIG. 3 (except there is no isolation gate 13).

In FIG. 1, a small orifice 17 is formed through the partition wall 16, which separates the atmospheric pressure ionization chamber 15 from the intermediate evacuation chamber 21. The rear end of the capillary tube 11 abuts on the small orifice 17, and the internal channel 18 of the capillary tube 11 is in communication with the small orifice 17. Since the diameter of the small orifice 17 is set to be substantially equal to the inner diameter of the capillary tube 11, i.e., the diameter of the internal channel 18, a continuous channel is formed from the capillary tube 11 through the partition wall 16 by which the atmospheric pressure ionization chamber 15 is brought into communication with the intermediate evacuation chamber 21. That is, the capillary tube 11 is equivalent to that being disposed through the partition wall 16 itself, and can fulfill the desolvating function in the same manner as that performed in a conventional construction.

When the capillary tube 11 is removed for maintenance, the atmospheric pressure ionization chamber 15 and the intermediate evacuation chamber 21 are in communication only through the small orifice 17. The channel resistance of the small orifice 17 alone does not differ significantly from the situation in which the capillary tube 11 is attached. Thus, the increase in the load applied to the oil rotary pump (not shown) that evacuates the intermediate evacuation chamber 21 would be minimal, and a required vacuum can be maintained in the intermediate evacuation chamber 21.

Embodiment 1

Figure 2A:
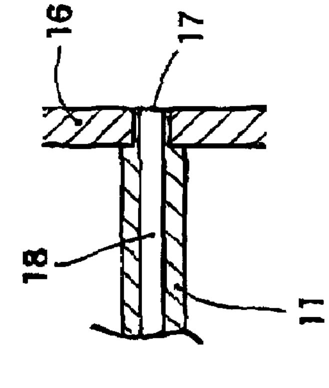
FIGS. 2(A), 2(B), and 2(C) are diagrams showing other embodiments of the present invention.
Figure 2B:
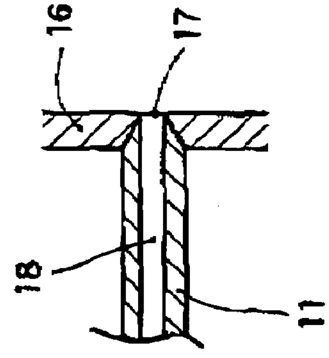
Figure 2C:
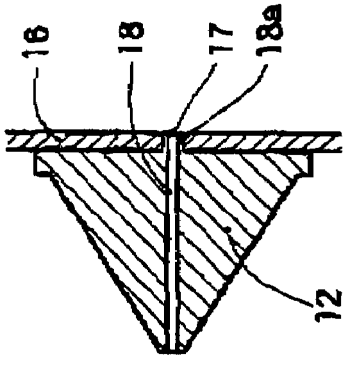

The embodiment of the invention shown in FIG. 1 illustrates the basic construction of the present invention. FIGS. 2(A), 2(B), and 2(C) show several other embodiments of the present invention (described herein, respectively, as embodiments 1, 2, and 3), with various improvements for practical use.

FIG. 2(A) is an enlarged sectional view of the junction between the capillary tube 11 and the small orifice 17. The rear end section of the capillary tube 11 has reduced thickness, and is fitted into the small orifice 17. In this embodiment, the diameter of the small orifice 17 needs to be slightly larger than the inner diameter of the capillary tube 11. Since the inner wall of the small orifice 17 is covered, contamination of the inner wall can be prevented.

Embodiment 2

FIG. 2(B) also shows the junction between the capillary tube 11 and the small orifice 17. In this second embodiment, the male taper formed in the rear end section of the capillary tube 11 mates with the female taper of the small orifice 17 formed so as to widen towards the atmospheric pressure ionization chamber 15. In this embodiment, the diameter of the small orifice 17 can be controlled to a size that is substantially equal to the inner diameter of the capillary tube 11, and the inner wall of the small orifice 17 is covered to protect against contamination.

In FIGS. 2(A) and (B), the heating block **12*a* is not depicted; it should be assumed, however, that the heating block 12*a* is fitted around the capillary tube 11, as in the case of FIG. 1**.

Embodiment 3

FIG. 2 (C) shows a third embodiment in which the capillary tube 11 is integrated with the heating block **12*a* to form a conical desolvating unit 12. That is, a conical block is formed with a material such as stainless steel, and the internal channel 18 is formed from the peak of the cone through the bottom surface along its axis. Such a construction is functionally equivalent to the aforementioned desolvating unit 12 composed by combining the capillary tube 11 and the heating block 12*a*. The rear end section of the internal channel 18 forms the projection 18*a*, which projects from the bottom surface of the cone in a distance corresponding to the thickness of the partition wall 16. The projection 18*a* is fitted into the small orifice 17 in the same manner as in the embodiment of FIG. 2(A) so as to cover the inner wall of the small orifice 17**.

The projection **18*a* may be a male taper to be mated with the female taper of the small orifice 17, as in the case of FIG. 2**(B).

Moreover, although not specifically shown in the figures, interposing a packing material, such as an O-ring, between the aforementioned desolvating unit 12 and the partition wall 16 at the time of installation to ensure air-tightness should naturally be considered as a matter of design variation.

In the embodiments described above, the small orifice 17 is formed directly in the partition wall 16. In another possible embodiment of the invention, for design purposes, a plate having the small orifice 17 with the desolvating unit 12 installed thereto may be attached to the partition wall 16. In such an embodiment, the plate can be perceived as being one part of the partition wall 16, and thus the construction falls within the scope of the present invention.

The MS according to the present invention can be utilized not only as an LC/MS, but also potentially, for example, as an ICP/MS in combination with the ICP (inductively coupled plasma) emission spectrometry method.

The above-described embodiments are but several examples of the system according to the present invention. The description is illustrative, and the scope of the invention, including modifications, revisions, and additions thereto, is limited only by the appended claims.

The disclosure of Japanese Patent Application No. 2004-361071 filed on Dec. 14, 2004, is incorporated herein.

What is claimed is:

1. An atmospheric pressure ionization mass spectrometry system comprising:

an atmospheric pressure ionization chamber for ionizing a sample, an intermediate evacuation chamber into which generated ions are introduced, a vacuum chamber disposed further downstream therefrom into which said ions are introduced for mass separation, a partition wall separating said atmospheric pressure ionization chamber from said intermediate evacuation chamber, said wall having an orifice therein, and a capillary tube installed on said partition wall so that an outlet end of said capillary tube abuts on said orifice, said capillary tube as a whole being directly attached to and detached from the partition wall, and having an internal diameter substantially corresponding to a diameter of the orifice to communicate with said orifice so that when the capillary tube is removed from the partition wall, the orifice communicates with the intermediate evacuation chamber without substantial change of a vacuum condition therein.

2. The atmospheric pressure ionization mass spectrometry system according to claim 1, wherein an outlet end section of said capillary tube is reduced in diameter so as to be capable of fitting into said orifice.

3. The atmospheric pressure ionization mass spectrometry system according to claim 1, wherein an outlet end section of said capillary tube is a male taper capable of being mated with a female taper formed in said orifice.

4. The atmospheric pressure ionization mass spectrometry system according to claim 1, wherein said capillary tube is an integral part of a metal block having said internal channel formed therethrough.

5. The atmospheric pressure ionization mass spectrometry system according to claim 4, wherein an outlet end section of said capillary tube is reduced in diameter so as to be capable of fitting into said orifice.

6. The atmospheric pressure ionization mass spectrometry system according to claim 4, wherein an outlet end section of said capillary tube is a male taper capable of being mated with a female taper formed in said orifice.

* * * * *